United States Patent [19]

Kerherve

[11] Patent Number: 5,681,378
[45] Date of Patent: Oct. 28, 1997

[54] COATING COMPOSITION FOR THE PROTECTION OF METAL AGAINST CORROSION

[75] Inventor: Jean-Pierre Kerherve, Linas, France

[73] Assignee: Produtis Chimiques Auxiliares et de Synthese (P.C.A.S.), Longjumeau, France

[21] Appl. No.: 711,440

[22] Filed: Sep. 6, 1996

[30] Foreign Application Priority Data

Sep. 14, 1995 [FR] France ................... 95 10771

[51] Int. Cl.$^6$ .................................................. C09D 5/08
[52] U.S. Cl. ...................... 106/14.15; 106/14.11; 106/14.13; 106/14.18; 106/14.34; 106/14.35; 106/14.36; 106/14.37; 106/14.42; 427/384; 427/388.4
[58] Field of Search ............ 106/14.15, 14.42, 106/14.13, 14.11, 14.18, 14.34, 14.35, 14.36, 14.37; 148/248; 427/384, 388.4

[56] References Cited

U.S. PATENT DOCUMENTS

| | | | |
|---|---|---|---|
| 4,343,660 | 8/1982 | Martin | 106/14.42 |
| 4,395,286 | 7/1983 | Sturwold | 106/14.13 |
| 4,444,802 | 4/1984 | Winters et al. | 106/14.13 |
| 4,479,981 | 10/1984 | Winters et al. | 106/14.13 |
| 4,495,225 | 1/1985 | Ciuba et al. | 106/14.23 |
| 4,582,543 | 4/1986 | Bretz | 106/14.12 |
| 4,615,813 | 10/1986 | Bretz | 507/128 |
| 4,631,083 | 12/1986 | Christhilf et al. | 106/14.25 |
| 4,647,309 | 3/1987 | Hayner | 106/14.15 |
| 4,718,942 | 1/1988 | Laura et al. | 106/14.43 |
| 4,729,791 | 3/1988 | Laura et al. | 106/14.23 |
| 4,749,412 | 6/1988 | Ciuba et al. | 106/14.23 |
| 4,851,043 | 7/1989 | Dotson et al. | 106/14.11 |
| 5,037,877 | 8/1991 | Kerherve | 524/560 |
| 5,045,361 | 9/1991 | Kerherve | 427/388.2 |
| 5,338,347 | 8/1994 | Rohr et al. | 106/14.13 |
| 5,407,471 | 4/1995 | Rohr et al. | 106/14.13 |
| 5,455,075 | 10/1995 | Longo | 106/14.43 |

FOREIGN PATENT DOCUMENTS 0093323  11/1983  European Pat. Off. .

*Primary Examiner*—Anthony Green
*Attorney, Agent, or Firm*—Greenblum & Bernstein, P.L.C.

[57] ABSTRACT

An aqueous composition for the protection of metal surfaces against corrosion includes, as an emulsion in water at least one overbased compound which is a water-insoluble salt. The overbased compound has a basic neutralization number of more than 40. In addition to the overbased compound, the aqueous composition also includes at least one surfactant constituted by an ammonium salt of an organic acid.

19 Claims, No Drawings

COATING COMPOSITION FOR THE PROTECTION OF METAL AGAINST CORROSION

BACKGROUND OF THE INVENTION

1. Field of the Invention

The present invention concerns an aqueous composition for the protection of a metal surface against corrosion, in particular a coating composition which can be applied directly to the surface or used as an additive in a paint for application to the surface.

2. Description of the Prior Art

A number of coating compositions have been proposed for the protection of ferrous and non-ferrous metals and alloys thereof against corrosion. Anticorrosion coatings are obtained by applying the compositions to the surfaces. The coatings obtained may be permanent for (example paint) or temporary (for example protective oils or waxes which can be eliminated by detergents or solvents). The compositions contain active elements and film-forming agents in solution or dispersed in organic solvents or water. Organic solvents, however, have a number of known disadvantages: evaporation after application of the coating causes pollution problems and in some cases toxicity problems; further, they are generally only slightly biodegradable, and so have an additional negative environmental effect; they are relatively expensive; they are flammable, etc.

Currently, then, aqueous emulsions are preferred and usually comprise water, a corrosion inhibitor, a temporary or permanent surfactant or emulsifier, a co-solvent and a wax and/or polymeric film generator. Within the context of the present description, the term "temporary" denotes a compound which acts as a surfactant in the emulsion from which the protective coating or film is to be prepared, then loses its surfactant properties after application of the coating to the surface to be treated, for example by means of a chemical reaction as the coating dries. In contrast, the term "permanent" denotes a compound which retains its surfactant properties after application of the coating to the surface to be treated and drying.

Aqueous emulsions have been disclosed in U.S. Pat. No. 4,479,981 from Ashland Oil, Inc., which uses an overbased organic sulfonate as the corrosion inhibitor and a sulfonate or an amide alkanol or an amine salt of a carboxylic acid as the surfactant. The same types of surfactant are used in the coating composition disclosed in U.S. Pat. No. 4,647,309 from Ashland Oil, Inc., which composition also contains carbon black. U.S. Pat. No. 4,395,286 from Cincinnati-Vulcan Company uses an amine salt (ammonium salts are excluded) or a monovalent metal salt of a sulfonic acid as the surfactant.

The disadvantage of these above-noted emulsions is that they use permanent surfactants which render the film formed from them sensitive to water. The performance of the corrosion-protective coating in corrosion tests such as the salt spray test is thus only mediocre.

The aim of the present invention is thus to overcome the disadvantages of the prior art by providing a novel composition in the form of an aqueous emulsion comprising a temporary surfactant, the composition being for the protection of a metal surface against corrosion, in particular for use as a coating composition which is directly applicable to the surface and as an additive in a paint for application to the surface. It should, however, be obvious that these applications of the composition of the invention are not limiting and that it can be used, for example, as an additive in an anticorrosive primer.

SUMMARY OF THE INVENTION

The composition of the invention comprises, as an emulsion in water:
a) at least one overbased compound which is a water-insoluble salt, wherein the overbased compound has a neutralization number of more than 40; and
b) at least one surfactant constituted by an ammonium salt of an organic acid.

Optionally, the composition can also contain a co-solvent.

The aqueous composition of the invention generally contains 40% to 95% water, preferably about 70% water.

Within the context of the present invention, the adjective "overbased" denotes substances which are also known to the skilled person as "complexes", "metal complexes", "metal-rich salts", etc. Overbased substances are formed from a metal and an organic compound and contain an excess of metal with respect to the stoichiometry of the reaction between the metal and the organic compound under consideration. Examples of overbased compounds which can be used in the present invention include water-insoluble salts of alkaline-earth metals, such as sulfonates, phenates and alkylphenates, salicylates and alkylsalicylates, phosphonates, thiophosphonates, naphthenates, carboxylates, etc, and mixtures thereof. The aqueous composition usually contains about 10% to about 25% by weight of overbased compound. It preferably contains about 20% of overbased compound.

The surfactant is a "temporary" surfactant in that it acts as an emulsifier when it is present in the emulsion in the form of an ammonium salt and in that during drying it decomposes to ammonia which evaporates off and to an acid which reacts with the overbased compound to form a salt which is only slightly water-soluble. The temporary surfactant can, for example, be an ammonium salt of a carboxylic acid prepared by bringing a carboxylic acid into the presence of ammonia. Suitable carboxylic acids include linear or branched-chain saturated or unsaturated mono- or polycarboxylic acids containing 6 to 30 carbon atoms, and mixtures thereof. The temporary surfactant can also be an ammonium salt of a sulfonic acid obtained by reacting a sulfonic acid with ammonia. Suitable sulfonic acids include alkylsulfonic acids, linear or branched mono-, di- or trialkyl benzenesulfonic acids containing 8 to 60 carbon atoms, mono- or polyalkyl naphthalenesulfonic acids, compounds known as "linear alkyl bottoms" obtained by sulfonation of the bottom products from the distillation of alkylbenzenes, natural sulfonic acids, and mixtures thereof. Preferred sulfonic acids include monoalkyl- and dialkylbenzenesulfonic acids where the alkyl group is linear or branched and contains 8 to 60 carbon atoms, in particular monoalkylbenzenesulfonic acids in which the alkyl group contains an average of 24 carbon atoms. The temporary surfactant used in the present invention can also be an ammonium salt of one of the following acids: alkylphosphoric or alkylarylphosphoric acids, alkylphosphonic or alkylarylphosphonic acids, rosin acids and naphthenic acids. Finally, the surfactant of the invention may be a mixture of several of the compounds described above. The surfactant constitutes about 5% to about 15% of the total weight of the aqueous composition, preferably about 10% of the total composition weight.

The co-solvent, which stabilizes and liquefies the emulsion, prevents the inclusion of water in the film during drying by forming an azeotrope with water and facilitates the formation of a regular coating film, is generally selected from the following compounds: alkylethers of mono- or dialkyleneglycols or esters thereof, ether-alcohol esters and alcohols containing 3 to 12 carbon atoms. The co-solvent is preferably an alkylether of a dialkyleneglycol. The co-solvent constitutes 0% to 20% of the total weight of the aqueous composition, preferably 5% to 10% of the total composition weight.

The aqueous composition of the invention, in particular when it is used as a coating composition, can also contain at least one of the following compounds:

an anti-foaming agent to facilitate formation and application of a bubble-free film;

a biocidal preservative to prevent micro-organisms from attacking the emulsion constituents;

a filler to increase the strength of the film;

an anticorrosion pigment or a conventional pigment;

a specific anticorrosion agent to prevent the appearance of rust while the film is drying after its application to the surface to be treated;

an emulsified polymer or wax to increase film hardness, etc.

When it is used as a coating composition, the composition described above can be applied using any means known to the skilled person. As an example, the coating can be applied by dipping, brushing, spraying, die coating, roller coating, etc. The metal surfaces to be coated can, for example, be constituted by iron, aluminum, copper, zinc, etc. and alloys thereof.

When used as an anticorrosion additive in a paint, for example an acrylic type paint or a "polyester" type paint, the composition of the invention is advantageously added in a quantity of about 0.5% to about 25%, preferably in the order of 1%.

DETAILED DESCRIPTION OF THE PREFERRED EMBODIMENTS

The following example illustrates a preferred method of preparing one example of a composition according to the invention, which was tested as a coating composition and as an anticorrosion additive for paint.

EXAMPLE

Preparation of the emulsion 350 g of deionized water and 60 g of the butyl ether of ethyleneglycol were introduced into a 1 liter beaker. 42 g of a benzenesulfonic acid with a substituent containing 24 carbon atoms was dispersed at ambient temperature with agitation, using apparatus such as an Ultra Turrax available from JANKE & KUNKEL, Staufen, Germany. About 7 g of 25% ammonia was then added. The solution obtained was clear and had a pH on the order of 8.5.

The solution was heated to about 60° C., avoiding loss of ammonia. 141 g of ARCOT 785 (formerly known as ARCOT 800) which had been melted at about 90° C. was slowly poured into the solution with vigorous shearing agitation. ARCOT 785 is a complexed compound derived from an overbased calcium carboxylate with a basic neutralization number on the order of 130 mg of KOH/g, available from P.C.A.S., Longjumeau, France. The resulting solution was cooled with agitation and stored at a temperature of about 30° C.

The composition was a fluid, homogeneous liquid which was brown in color and of low odor, with no perceptible odor of ammonia. The composition had a pH of 7.8. The composition (emulsion) was homogeneous at the end of its manufacture, after 24 hours and after one month. No dropout, i.e. separation of the constituents, was observed. The Brookfield viscosity of the composition was measured at 23° C. The Brookfield viscosity was 4.250, 2.750, 1.700 and 1.200 cPs at rates of 2, 4, 10 and 20 respectively: the composition was thus fluid. The theoretical dry extract was 30%, measured after being in an oven at 105° C. for 18 hours. The dry extract was tacky and its fat edge formation temperature was over 100° C.

All the compositions shown in Tables 1, 2 and 3 were prepared in similar fashion to the above composition which is identified by the reference number 18.

A. Use of the emulsion as a coating composition

A film of the above composition (emulsion) was applied manually to a steel test piece edged with wax. Flash rusting on the film was evaluated visually by observing the surface and the density of any spots of corrosion after 24 hours of drying: no rust spots were visible on the film. A 180° bending test was also carried out on a test piece coated with a 100 micron film of the above composition, after cooling the test piece for one hour at −30° C. This test produced satisfactory results. Finally, the film was salt spray tested in accordance with standard NFX 41002. The number of hours of resistance in this test without significant formation of rust was measured, along with the film thickness after 72 hours of drying, to determine the resistance/thickness ratio. The results are given in Table 4.

Table 5 compares the results obtained in the salt spray test using composition 18 above and prior art anticorrosion compositions.

The composition tested thus had a much better salt spray resistance than the prior art compositions.

Identical tests were carried out on compositions 1 to 18 of Tables 1, 2 and 3. The results of these tests are shown in the tables.

COMPARATIVE EXAMPLES

Various coating compositions obtained using the teaching of the present invention were tested and compared.

Comparative example 1: Temporary surfactant

Six compositions of the present invention were tested, each comprising 20% by weight of ARCOT 645, an overbased sulfonic acid with a basic neutralization number of 170 mg KOH/g available from P.C.A.S., Longjumeau, France, 10% by weight of a temporary surfactant, 5% by weight of the (mono)butyl ether of diethyleneglycol and about 65% by weight of deionized water.

The surfactants used were respectively the ammonium salts of the following compounds:

Composition No 1: a benzenesulfonic acid with an alkyl substituent containing 24 carbon atoms.

Composition No 2: a carboxylic acid containing 8 carbon atoms.

Composition No 3: a carboxylic acid containing 18 carbon atoms.

Composition No 4: a benzenesulfonic acid with a substituent containing 19 carbon atoms.

Composition No 5: a benzenesulfonic acid with two substituents each containing 11 carbon atoms.

Composition No 6: a benzenesulfonic acid with a substituent containing 12 carbon atoms.

The results are shown in Table 1.

Comparative example 2: Temporary surfactant

The above tests were repeated, replacing ARCOT 645 with ARCOT 785.

Resulting compositions 7, 8, 9, 10 and 11 corresponded to compositions 1, 2, 3, 4, 5 and 6 respectively.

The results are shown in Table 2.

The principal parameters of the tested coating compositions were extracted from Tables 1 and 2, namely: emulsifier quality, flash rusting on drying, salt spray resistance. Each parameter was then classified into one of the following categories: very good, good, medium, poor, very poor. The quality of the emulsifier was then determined by visual evaluation of the homogeneity of the emulsions prepared over a period of time of up to one month. The emulsifier was deemed to be very good when the emulsions were homogeneous, medium when they became heterogeneous, poor when the observed drop-out was about 5%, and very poor at higher degrees of drop-out.

The results are shown in Table 6.

Comparative example 3: Filler and co-solvent

In Table 3, composition 15 contained 25% of talc. Compositions 16, 17 and 18 contained different proportions of co-solvent.

B. Use of the emulsion as an anticorrosion additive for paint

Table 7 illustrates a comparative test in which different characteristics of two acrylic paint compositions were evaluated, in particular the salt spray resistance. Composition 1 contained components conventionally used in such paints, The only difference between composition 1 and composition 2 was that composition 2 also contained 5.5% of an additive of the invention, corresponding to composition No 18 of Table 3.

Table 7 shows that the additive of the invention conferred excellent anticorrosion properties on the tested paint.

A further test was carried out using a "polyester" type paint to which 1% of a composition of the invention had been added. This composition was identical to composition No 18 of Table 3 except that the oil was removed from the ARCOT 785.

This test showed that after curing, the paint composition obtained had a salt spray resistance, determined in accordance with the standard cited above, of more than 500 hours.

TABLE 1

| Composition No | 1 | 2 | 3 | 4 | 5 | 6 |
|---|---|---|---|---|---|---|
| ARCOT 645 | 20 | 20 | 20 | 20 | 20 | 20 |
| Sulfonic acid C24/$NH_4^+$ | 10 | | | | | |
| Carboxylic acid C8/$NH_4^+$ | | 10 | | | | |
| Carboxylic acid C18/$NH_4^+$ | | | 10 | | | |
| Sulfonic acid C19/$NH_4^+$ | | | | 10 | | |
| Sulfonic acid 2 × C11/$NH_4^+$ | | | | | 10 | |
| Sulfonic acid C12/$NH_4^+$ | | | | | | 10 |
| Deionized water | 65 | 65 | 65 | 65 | 65 | 65 |
| Diethyleneglycol butylether | 5 | 5 | 5 | 5 | 5 | 5 |
| TOTAL | 100 | 100 | 100 | 100 | 100 | 100 |
| Appearance, end of manufacture | homogeneous | homogeneous | homogeneous | homogeneous | homogeneous | homogeneous |
| Appearance, 24 h | homogeneous | homogeneous | homogeneous | homogeneous | heterogeneous | 10% dropout |
| Color | beige | white | white beige | brown beuge | beige | white beige |
| Viscosity, 24 h | thick | liquid | solid | very thick | thick | liquid |
| Appearance, emulsion, 1 month | ~homogeneous | ~homogeneous | 5% droupout | ~homogeneous | eliminated | 50% dropout |
| % theoretical dry extract | approx. 30% | approx. 30% | approx. 30% | approx. 30% | approx. 30% | approx. 30% |
| Tackiness | oily | oily+ | greasy | oily | oily | oily |
| Flash rusting (24 h) | medium | 1 spot | 0% | slight | high | not tested |
| Test No 1, salt spray | | | | | | |
| Thickness (µm) | 17.5 | 23.5 | 30 | 28 | not tested | 25.5 |
| Resistance (h) | 170 | 140 | 10 | 150 | not tested | 8 |
| Resistance/thickness ratio (h/µm) | 10 | 6 | 0 | 5 | not tested | 0 |
| Test No 2, salt spray | | | | | | |
| Thickness (µm) | 14 | 13 | not tested | 26 | not tested | 31 |
| Resistance (h) | 140 | 100 | not tested | 140 | nit tested | 8 |
| Resistance/thickness ratio (h/µm) | 10 | 8 | not tested | 5 | not tested | 0 |

TABLE 2

| Composition No | 7 | 8 | 9 | 10 | 11 |
|---|---|---|---|---|---|
| ARCOT 785 | 20 | 20 | 20 | 20 | 20 |
| Sulfonic acid C24/$NH_4$+ | 10 | | | | |
| Carboxylic acid C8/$NH_4$+ | | 10 | | | |
| Carboxylic acid C18/$NH_4$+ | | | | | |
| Sulfonic acid C19/$NH_4$+ | | | 10 | | |
| Sulfonic acid 2 × C11/$NH_4$+ | | | | 10 | |
| Sulfonic acid C12/$NH_4$+ | | | | | 10 |

TABLE 2-continued

| Composition No | 7 | 8 | 9 | 10 | 11 |
|---|---|---|---|---|---|
| Deionized water | 65 | 65 | 65 | 65 | 65 |
| Diethyleneglycol butylether | 5 | 5 | 5 | 5 | 5 |
| TOTAL | 100 | 100 | 100 | 100 | 100 |
| Appearance, end of manufacture | homogeneous | heterogeneous | homogeneous | heterogeneous | homogeneous |
| Appearance, 24 h | homogeneous | heterogeneous | homogeneous | heterogeneous | homogeneous |
| Color | brown beige | eliminated | dark brown | eliminated | light brown |
| Viscosity, 24 h | medium | eliminated | medium | eliminated | medium |
| Appearance, emulsion, 1 month | homogeneous | eliminated | homogeneous | eliminated | 5% dropout |
| % theoretical dry extract | approx. 30% | approx. 30% | approx. 30% | approx. 30% | approx. 30% |
| Tackiness | tacky | greasy | greasy - | oily | greasy |
| Flash rusting (24 h) | 0% | not tested | medium | not tested | 0% |
| Test No, salt spray | | | | | |
| Thickness (µm) | 13.5 | not tested | 27.5 | not tested | 18 |
| Resistance (h) | 250 | not tested | 900 | not tested | 8 |
| Resistanc/thickness ratio (h/µm) | 19 | not tested | 33 | not tested | 0 |
| Test No 2, salt spray | | | | | |
| Thickness (µm) | 33 | not tested | 30 | not tested | 32.5 |
| Resistance (h) | 800 | not tested | 850 | not tested | 8 |
| Resistance/thickness ratio (h/µm) | 24 | not tested | 28 | not tested | 0 |

TABLE 3

| Composition No | 13 | 14 | 15 | 16 | 17 | 18 |
|---|---|---|---|---|---|---|
| ARCOT 785 | 20 | 16 | 10.5 | 23.5 | 23.5 | 23.5 |
| Sulfonic acid C24/NH$_4^+$ | | 15 | 10 | 7.5 | 7.5 | 7.5 |
| Sodium sulfonate | 10 | | | | | |
| Talc | | | 25 | | | |
| Deionized water | 65 | 62 | 47.5 | 64 | 62 | 59 |
| Diethyleneglycol butylether | 5 | 7 | 7 | 5 | 7 | 10 |
| TOTAL | 100 | 100 | 100 | 100 | 100 | 100 |
| Appearance, end of manufacture | homogeneous | homogeneous | homogeneous | homogeneous | homogeneous | homogeneous |
| Appearance, 24 h | homogeneous | homogeneous | homogeneous | homogeneous | homogeneous | homogeneous |
| Color | brown | dark brown | beige brown | brown | brown | brown |
| Viscosity, 24 h | liquid | liquid | liquid | solid | thick | liquid |
| Appearance, emulsion, 1 month | ~heterogeneous | homogeneous | 10% dropout | eliminated | ~homogeneous | homogeneous |
| % theoretical dry extract | approx. 30% | approx. 30% | approx. 45% | eliminated | approx. 30% | approx. 30% |
| Tackiness | oily | tacky | ~dry | eliminated | eliminated | tacky |
| Flash rusting (24 h) | 1% | 0% | 0% | eliminated | 0% | 0% |
| Test No 1, salt spray | | | | | | |
| Thickness (µm) | 43.5 | 54 | 32.5 | eliminated | not tested | 9 |
| Resistance (h) | 250 | >1000 | 1000 | eliminated | not tested | 240 |
| Resistance/thickness ratio (h/µm) | 6 | >20 | 31 | eliminated | not tested | 27 |
| Test No 2, salt spray | | | | | | |
| Thickness (µm) | 22 | not tested | not tested | eliminated | not tested | 20 |
| Resistance (h) | 200 | not tested | not tested | eliminated | not tested | 1000 |
| Resistance/thickness ratio (h/µm) | 9 | not tested | not tested | eliminated | not tested | 50 |

TABLE 4

| Salt spray resistance | Thickness | Resistance/ thickness ratio |
|---|---|---|
| approx. 240 hours | 9 µm | approx. 27 h/µm |
| approx. 1 000 hours | 20 µm | approx. 50 h/µm |
| approx. 1 500 hours | 30 µm | approx. 50 h/µm |

TABLE 5

| Composition | Salt spray resistance | Thickness | Resistance/ thickness ratio |
|---|---|---|---|
| 18 (Table 3) | 1 500 h | 30 µm | 50 h/µm |
| US-A-4 851 043 | 360 h | — | — |
| US-A-4 479 981 | 1 000 h | 76 µm | 13 h/µm |
| US-A-4 444 802 | 400 h | 48 µm | 8 h/µm |
| 13 (Table 3) | 200 h | 22 µm | 9 h/µm |

TABLE 6

| Compositions | Emulsifier | Rust prevention on drying | Salt spray resistance |
|---|---|---|---|
| 1 and 7 | Good | Good | Very good |
| 2 and 8 | Medium | Good | Good |
| 3 | Poor | Good | Very poor |
| 4 and 9 | Very good | Poor | Good |
| 5 and 10 | Poor | Poor | Not tested |
| 6 and 11 | Poor | Good | Very poor |

TABLE 7

| | 1 | 2 |
|---|---|---|
| Composition | | |
| Acrylic emulsion A | 12.7% | 12.7% |
| Titanium oxide | 4.4% | 4.4% |
| Talc | 4.6% | 4.6% |
| Anticorrosion pigment | 7.3% | 7.3% |
| Antifoaming agent | 0.2% | 0.2% |
| Acrylic emulsion B | 49.5% | 49.5% |
| Co-solvent A | 1.7% | 1.7% |
| Co-solvent B | 4.5% | 4.5% |
| Antirust agent | 0.15% | 0.15% |
| Spreading agent | 0.5% | 0.5% |
| Example 18 | 0 | 5.5% |
| 20.5 wt % $NH_4OH$ | 0.6% | 0.6% |
| Water | 13.85% | 8.35% |
| Characteristics | | |
| Dry extract | 41.0 wt % | 41.0 wt % |
| pH | 8.2 | 8.2 |
| Viscosity | 250 cps | 250 cps |
| Pencil hardness (ASTM D 3363)[1] | H | HB |
| Adhesion, % eliminated (ASTM D 3359) | 0% | 0% |
| Konig pendulum (ASTM D 4366) | 69 s/cycle | 69 s/cycle |
| Salt spray (ASTM B 117) 75 h | | |
| blistering[2] | 2 F | 0 |
| penetration 250 h | >5 mm | 0 mm |
| blistering | 6 MD | 0 |
| penetration | >10 mm | >5 mm |

[1]B = rather soft
HB = rather hard
[2]Grading in ASTM D 714
Blister diameter: 2 = approx. 6 mm; 4 = approx. 3 mm; 6 = approx. 2 mm; 8 = approx. 1 mm
Blister density: F = low; M = medium; MD = high; D = very high There is claimed:

1. An aqueous composition for the protection of metal surfaces against corrosion comprising, as an emulsion in water:

a) at least one overbased compound which is a water-insoluble salt, wherein the overbased compound has a basic neutralization number of more than 40; and b) at least one surfactant comprising an ammonium salt of an organic acid.

2. The composition of claim 1, further comprising a co-solvent.

3. The composition of claim 2, wherein said co-solvent is selected from the group consisting of alkylethers, ether-alcohol esters, and alcohols containing 3 to 12 carbon atoms.

4. The composition of claim 1, wherein said overbased compound comprises a water-insoluble salt of an alkaline earth metal.

5. The composition of claim 1, wherein said surfactant comprises a temporary surfactant.

6. The composition of claim 5, wherein said temporary surfactant comprises an ammonium salt of a carboxylic acid.

7. The composition of claim 5, wherein said temporary surfactant comprises an ammonium salt of a sulfonic acid.

8. The composition of claim 7, wherein said temporary surfactant comprises an ammonium salt selected from the group consisting of monoalkyl benzenesulfonic acid and dialkyl benzenesulfonic acid.

9. The composition of claim 8, wherein said temporary surfactant comprises an ammonium salt of a monoalkyl benzenesulfonic acid in which the alkyl group contains an average of 24 carbon atoms.

10. The composition of claim 3, wherein said co-solvent is an alkylether of a dialkylene glycol.

11. The composition of claim 1, wherein said overbased compound is about 10% to about 25% of the total composition weight.

12. The composition of claim 5, wherein said temporary surfactant is about 5% to about 15% of the total composition weight.

13. The composition of claim 2, wherein said co-solvent is up to about 20% of the total composition weight.

14. The composition of claim 1, further comprising at least one member selected from the group consisting of an anti-foaming agent, a biocidal preservative, a filler, and a pigment.

15. The composition of claim 1, further comprising at least one member selected from the group consisting of an emulsified polymer and wax.

16. A method of coating, comprising coating an aqueous composition on a substrate, wherein the aqueous composition comprises, as an emulsion in water:

a) at least one overbased compound which is a water-insoluble salt, wherein the overbased compound has a basic neutralization number of more than 40; and b) at least one surfactant comprising an ammonium salt of an organic acid.

17. A method of forming an anticorrosion paint, comprising combining an aqueous composition and a paint component, wherein the aqueous composition comprises, as an emulsion in water:

a) at least one overbased compound which is a water-insoluble salt, wherein the overbased compound has a basic neutralization number of more than 40; and b) at least one surfactant comprising an ammonium salt of an organic acid.

18. The method of claim 17, wherein the aqueous composition is present in a quantity of about 0.5% to about 25%.

19. A method of forming an anticorrosion primer, comprising combining an aqueous composition and a primer component, wherein the aqueous composition comprises, as an emulsion in water:

a) at least one overbased compound which is a water-insoluble salt, wherein the overbased compound has a basic neutralization number of more than 40; and b) at least one surfactant comprising an ammonium salt of an organic acid.

* * * * *

UNITED STATES PATENT AND TRADEMARK OFFICE
CERTIFICATE OF CORRECTION

PATENT NO. : 5,681,378
DATED : October 28, 1997
INVENTOR(S) : Jean-Pierre KERHERVE It is certified that error appears in the above-indentified patent and that said Letters Patent is hereby corrected as shown below:

On the title page, section [73], "Assignee", change "Produtis Chimiques Auxiliares et de Synthese (P.C.A.S.)" to ---Produits Chimiques Auxiliaires et de Synthese (P.C.A.S.)---.

Signed and Sealed this

Twenty-third Day of June, 1998

BRUCE LEHMAN

*Attest:*

*Attesting Officer*

*Commissioner of Patents and Trademarks*